United States Patent
Lin et al.

(10) Patent No.: US 9,585,065 B2
(45) Date of Patent: Feb. 28, 2017

(54) MOBILE COMMUNICATIONS DEVICES AND METHODS FOR INTER-RADIO ACCESS TECHNOLOGY PERFORMANCE ENHANCEMENT

(71) Applicant: MediaTek Inc., Hsin-Chu (TW)

(72) Inventors: Chi-Chung Lin, New Taipei (TW); Chao-Chih Chang, Taichung (TW); Yen-Chih Yang, Taichung (TW); Lin-Chih Chu, Kaohsiung (TW)

(73) Assignee: MEDIATEK INC., Hsin-Chu (TW)

( * ) Notice: Subject to any disclaimer, the term of this patent is extended or adjusted under 35 U.S.C. 154(b) by 161 days.

(21) Appl. No.: 14/294,370

(22) Filed: Jun. 3, 2014

(65) Prior Publication Data

US 2015/0350964 A1    Dec. 3, 2015

(51) Int. Cl.
*H04W 36/00* (2009.01)
*H04W 36/14* (2009.01)

(52) U.S. Cl.
CPC .... *H04W 36/0022* (2013.01); *H04W 36/0083* (2013.01)

(58) Field of Classification Search
CPC . H04W 36/00; H04W 36/0022; H04W 36/17; H04W 36/0083
USPC .......................................... 455/436; 370/331
See application file for complete search history.

(56) References Cited

U.S. PATENT DOCUMENTS

| | | | |
|---|---|---|---|
| 2011/0188468 A1* | 8/2011 | Vikberg | H04W 36/0066 370/331 |
| 2011/0194427 A1* | 8/2011 | Shirota | H04W 36/0022 370/252 |
| 2013/0034080 A1* | 2/2013 | Yang | H04W 36/0055 370/331 |
| 2013/0235740 A1* | 9/2013 | Kim | H04W 24/04 370/252 |
| 2014/0087723 A1* | 3/2014 | Cili | H04W 24/08 455/426.1 |
| 2014/0179319 A1* | 6/2014 | Kim | H04W 36/30 455/436 |

* cited by examiner

*Primary Examiner* — William Nealon
(74) *Attorney, Agent, or Firm* — McClure, Qualey & Rodack, LLP

(57) ABSTRACT

A method for inter-radio access technology (inter-RAT) performance enhancement in a mobile communications device is provided. First, a first RAT is camped on to perform a first service. Thereafter, it is moved/fallen back to a second RAT from the first RAT to perform a second service. Cell information of the first RAT is then measured and collected during the performance of the second service in the second RAT. A first cell to return to the first RAT is determined according to the collected cell information of the first RAT after a call connection of the second RAT is released.

16 Claims, 4 Drawing Sheets

MOBILE COMMUNICATIONS DEVICES AND METHODS FOR INTER-RADIO ACCESS TECHNOLOGY PERFORMANCE ENHANCEMENT

BACKGROUND OF THE INVENTION

Field of the Invention

The invention generally relates to inter-radio access technology (inter-RAT) performance enhancement, and more particularly, to mobile communications devices and methods for inter-RAT performance enhancement in a wireless communications system associated with different RATs.

Description of the Related Art

In a typical mobile communications environment, a user equipment (UE) device may communicate voice and/or data signals with one or more service networks via cellular stations of the service networks. The wireless communications between the UE and the service networks may be in compliance with various radio access technologies (RATs), such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, Universal Mobile Telecommunications System (UMTS) technology and others.

Moreover, inter-radio access technology (inter-RAT) mobility involves transfer of a connection or mobility between a UE and a network from one RAT (e.g. the LTE system) to another RAT, such as the GSM/GPRS, UMTS, or CDMA system. A UE may perform the inter-RAT procedure to move to a RAT due to certain reasons such as handover, cell redirection, cell change order, or cell reselection. Conventionally, in some cases, UE may be redirected from one network supporting a first technology to a second network supporting a different technology. For example, some LTE networks may not support voice connections, or in some cases, an operator may wish to locate a voice-oriented device on a 2G or 3G network or move a voice connection to another network under their control or coordination for various reasons, such as mobility, loading, usage type, or other reasons. Alternately, the operator may wish to move a user receiving an incoming voice call to the other network. For example, the operator may wish to redirect a user from an LTE network and associated cells to another network, such as a UTRAN or GERAN network (e.g., a network that natively supports CS connections), using a procedure known as Circuit-Switched Fallback (CSFB). After that, if the UE needs to move to a previously camped RAT, the UE may need to execute a PLMN search, cell redirection or cell reselection. In the case of a PLMN search, the UE has to stop all of the on-going procedures, start a new for a PLMN, and then search for a cell of the PLMN. However, the UE may not be able to move to the camped RAT, or it may take a lot of time to move to the camped RAT.

For example, a UE in the LTE system may fall back to a legacy system, such as UMTS and GSM, due to loss of service, cell reselection, handover, CSFB or Internet Protocol Multimedia Subsystem (IMS) Single Radio Voice Call Continuity (SRVCC). Once the UE falls back to the legacy system, it is difficult to return to the LTE due to a lack of LTE cell information provided by the legacy system.

BRIEF SUMMARY OF THE INVENTION

Accordingly, embodiments of the invention provide mobile communications devices and methods for inter-radio access technology (inter-RAT) performance enhancement. In one aspect of the invention, a method for inter-radio access technology (inter-RAT) performance enhancement in a mobile communications device is provided. The method comprises the following steps. First, a first RAT is camped on to perform a first service. Thereafter, it is moved/fallen back to a second RAT from the first RAT to perform a second service. Cell information of the first RAT is then measured and collected during the performance of the second service in the second RAT. A first cell to return to the first RAT is determined according to the collected cell information of the first RAT after a call connection of the second RAT is released.

In another aspect of the invention, a mobile communications device with a wireless module and a controller module is provided. The wireless module performs wireless transceiving to and from a first cellular station of a first service network in compliance with a first radio access technology (RAT) and a second cellular station of a second service network in compliance with a second RAT, wherein the first RAT is a long term evolution (LTE) related technology and the second RAT is 2G/3G related technology. The controller module camps on the first RAT to perform a first service, moves/falls back to the second RAT from the first RAT to perform a second service and measures and collects cell information of the first RAT during the performance of the second service in the second RAT via the wireless module, and determines a first cell to return to the first RAT according to the collected cell information of the first RAT after a call connection of the second RAT is released.

Other aspects and features of the present invention will become apparent to those with ordinarily skill in the art upon review of the following descriptions of specific embodiments of apparatuses and methods for inter-RAT performance enhancement in a wireless communications system.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The 3GPP specifications are used to teach the spirit of the invention, and the invention is not limited thereto.

Figure 1:
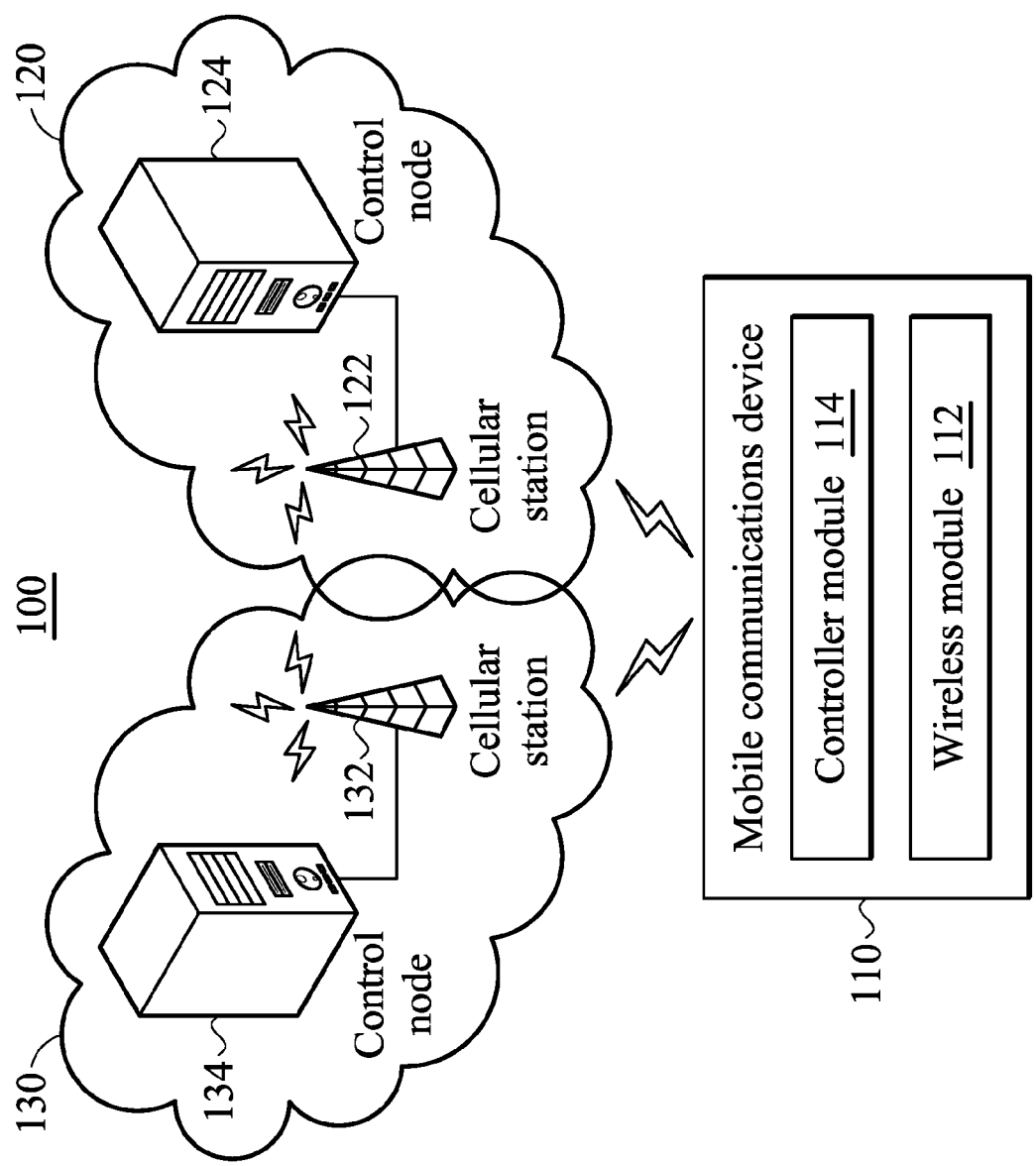
FIG. 1 is a block diagram illustrating a mobile communications environment according to an embodiment of the invention

FIG. 1 is a block diagram illustrating a mobile communications environment according to an embodiment of the invention. In the mobile communications environment 100, the mobile communications device 110 is wirelessly connected to the cellular station 122 of the service network 120 and the cellular station 132 of the service network 130 for obtaining wireless services. Generally, the cellular station 122 may be referred to as a base station, a cell or an access station, or may be referred to as an Home Node-B (HNB) in a WCDMA network or a Home e-Node-B (HeNB) in an LTE network, which is controlled by the control node 124 to provide the functionality of wireless transceiving for the service network 120. Similarly, the cellular station 132 may be referred to as a base station, a cell or an access station, or may be referred to as an HNB in a WCDMA network or a HeNB in an LTE network, which is controlled by the control node 134 to provide the functionality of wireless transceiving for the service network 130.

In this embodiment, the cellular station 122 is an LTE cellular station (or called an LTE cell) which supports the LTE technology and the cellular station 132 is a UTRA cellular station (or called a UTRA cell) which supports the UTRA technology or a GSM cellular station (or called a 2G cell) which supports the GSM technology. The mobile communications device 110 is referred to as a user equipment (UE) or a mobile station (MS), supporting the aforementioned RATs, and can be a device such as a mobile phone, a computer system, etc. The mobile communications device 110 comprises a wireless module 112 for performing the functionality of wireless transmission and reception to and from the cellular station 122 or the cellular station 132. To further clarify, the wireless module 112 may comprise a baseband unit (not shown) and a radio frequency (RF) unit (not shown). The baseband unit may contain multiple hardware devices to perform baseband signal processing, including analog-to-digital conversion (ADC)/digital-to-analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system, wherein the radio frequency may be 900 MHz, 1900 MHz, or 2100 MHz utilized in WCDMA systems, or may be 900 MHz, 2100 MHz, or 2.6 GHz utilized in LTE systems, or others depending on the radio access technology (RAT) in use. Also, the mobile communications device 110 further comprises a controller module 114 for controlling the operation of the wireless module 112 and other functional components, such as a display unit and/or keypad serving as the MMI (man-machine interface), a storage unit storing the program codes of applications or communication protocols, or others. In one embodiment, the service network 120 may be a WCDMA network and the mobile communications device 110 may be a UE in compliance with the 3GPP TS 24.008 specification and other related specifications of the WCDMA technology. In another embodiment, the service network 130 may be an LTE network and the mobile communications device 110 may be a UE in compliance with the 3GPP TS 24.301 specification and other related specifications of the LTE technology. Alternatively, the mobile communications device 110 may be a UE in compliance with both of the specifications of the WCDMA and LTE communication protocols, and the invention is not limited thereto.

To be more specific, the controller module 114 controls the wireless module 112 for performing inter-RAT procedure with the service network 120 and/or the service network 130 via the cellular station 122 and/or the cellular station 132, respectively.

Figure 2:
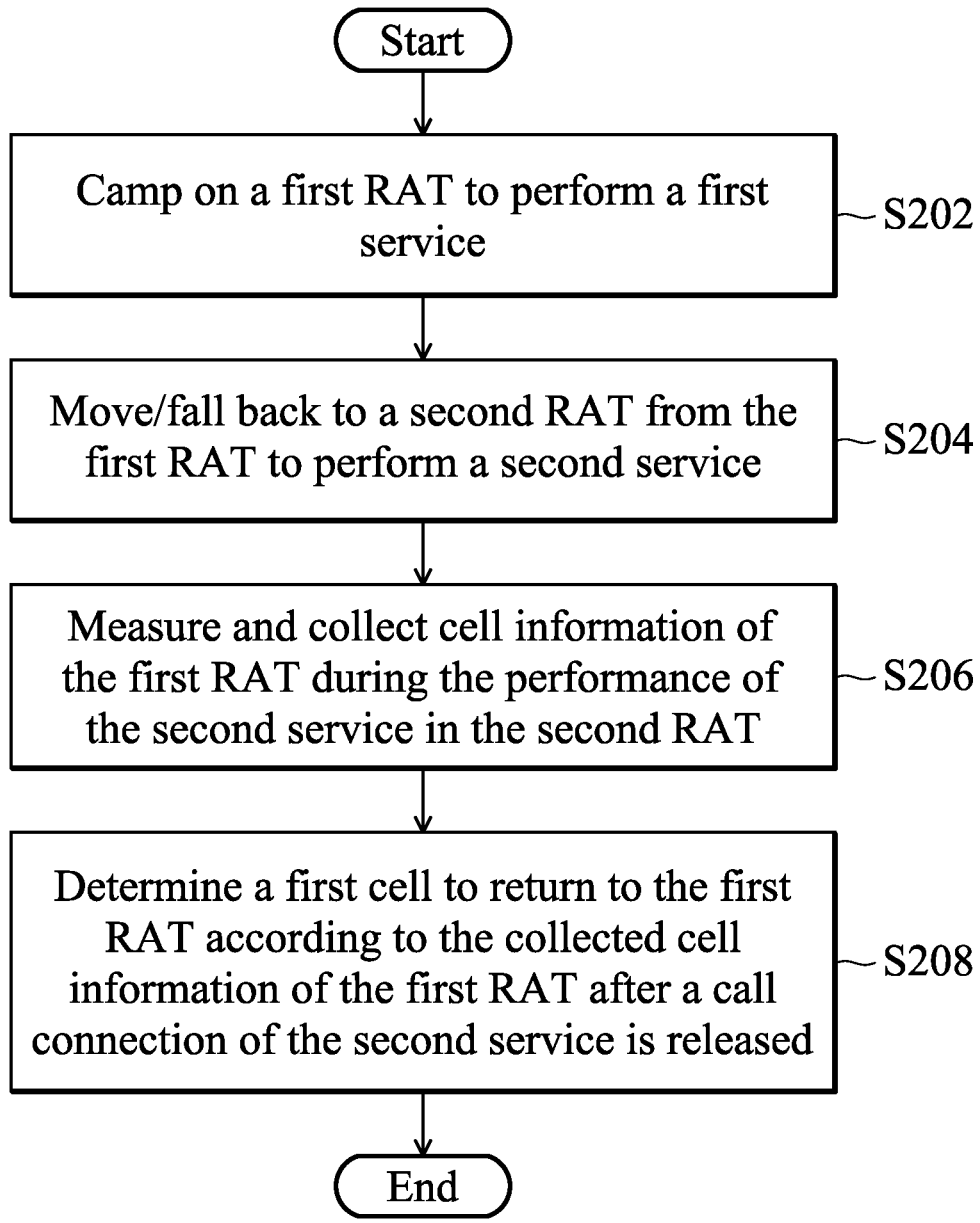
FIG. 2 is a flow chart illustrating a method for inter-RAT performance enhancement in a mobile communications device according to an embodiment of the invention.

FIG. 2 is a flow chart illustrating a method for inter-RAT performance enhancement in a mobile communications device according to an embodiment of the invention. In this embodiment, the mobile communications device (e.g. the mobile communications device 110) is capable of camping on a first cellular station of the first service network and is also capable of camping on a second cellular station of a second service network, wherein the first service network supports a first RAT (e.g. the long term evolution (LTE) technology) and the second service network supports a second RAT (e.g. the Universal Terrestrial Radio Access (UTRA) technology).

First, in step S202, the mobile communications device camps on a first RAT to perform a first service. To be more specific, in one embodiment, the mobile communications device may camp on a 4G network to perform a packet-switched (PS) data service.

After camping on the 4G network, the mobile communications device may perform the inter-RAT procedure to move to another RAT due to certain reasons such as handover, circuit-switched fallback (CSFB), Single Radio Voice Call Continuity (SRVCC), cell redirection, cell change order, or cell reselection. For example, the mobile communications device in the LTE system may fall back to a legacy system, such as UMTS and GSM, due to loss of service, cell change order, cell reselection, handover, CSFB or Internet Protocol Multimedia Subsystem (IMS) SRVCC.

CSFB is a mechanism where the LTE network (i.e. the 4G network) moves the mobile communications device to a legacy network which supports voice calls (e.g. the 2G/3G network). In case of CSFB, the voice call is never active in LTE. When a voice call needs to be started, the mobile communications device may initiate ESR (Extended Service Request) and the network moves it to a legacy network through redirection/handover or a cell change order (CCO). The mobile communications device then initiates the call control procedures in legacy. Whereas SRVCC is a process where the active voice call in LTE (may be VOIP), is handed over to the CS domain of the legacy network (MSC). This is useful when the mobile communications device is in an LTE coverage area and has an active voice call over IMS and it moves out of the LTE area into a legacy only network coverage. Instead of the call getting dropped, the call will be handed over to the CS legacy network if SRVCC is supported.

Thus, in step S204, the mobile communications device moves/falls back to a second RAT from the first RAT to perform a second service. For example, in one embodiment, the mobile communications device may move from the 4G network to a 2G/3G network to perform a circuit-switched (CS) service. Then, the mobile communications device performs the second service in the second RAT.

During the performance of the second service in the second RAT, the mobile communications device measures and collects cell information for cells of the first RAT in step S206. For example, while the CS service (e.g. a voice call) is being performed in the 2G/3G network, the mobile communications device can measure and collect cell information of the 4G network. Measurement and collection of cell information of the 4G network can be achieved by regularly measuring possible preferred RAT cells (which are the cells in the preferred RAT network), synchronizing them, and collecting their system information. In other words, the mobile communications device will keep tracking the cells of the 4G network and collect cell information of the 4G network when camped on the 2G/3G network during which time the second service is being provided, i.e. prior to completion of the second service. The collected cell information of the 4G network can then be stored into the storage unit of the mobile communications device, e.g. a database of the mobile communications device.

In some embodiments, in cases where the mobile communications device includes a first receiver and a second receiver, measurement and collection of the cell information of the first RAT while connected in the second RAT can be performed by measuring and collecting cell information for cells of the first RAT via the first receiver during the performance of the second service in the second RAT via the second receiver.

In some embodiments, in cases where the mobile communications device only has a single receiver, measurement and collection of the cell information of the first RAT while connected in the second RAT can be performed by determining idle time while connected in the second RAT and measuring and collecting cell information of the first RAT in the determined idle time. For example, the mobile communications device may determine idle time while connected in the second RAT, such as the gap or unused time between each two successive signal reception of the second RAT, and measure and collect cell information of the first RAT in the determined gap or unused time.

After the second service is complete (e.g. the call is released), the mobile communications device may be redirected, a cell change order, or autonomous return to the preferred RAT frequency or cell. For example, the mobile communications device may need to return to the 4G network to continue the PS data service when the call in the 2G/3G network is released. Specially, moving/falling back to the second RAT from the first RAT to perform the second service can be performed when the mobile communications device performs handover, CSFB, voice-over-LTE (VoIP) or Single Radio Voice Call Continuity (SRVCC).

In step S208, the mobile communications device determines a first cell to return to the first RAT according to the collected cell information of the first RAT after the call connection of the second service is released.

Determination of the first cell to return to the first RAT according to the collected cell information of the first RAT can be achieved by determining whether any cell information of the first RAT can be found after the second service is completed. For example, the mobile communications device may determine whether there is any cell information for cells of the first RAT in the collected cell information stored in the data and if so, determine or choose the found cell to be the first cell to return to the first RAT. To be more specific, in this embodiment, the mobile communications device can choose the preferred RAT cell which has already received its system information, and camp on it. Thus, with the collected cell information of the first RAT which is collected prior to completion of the second service during the camping on the second RAT, the mobile communications device can quickly return to the first RAT from the second RAT so as to continue the first service, thus reducing the camping time or the time for returning.

In some embodiments, the mobile communications device can measure and collect cell information of the first RAT while the call connection of the second RAT is not released.

Figure 3:
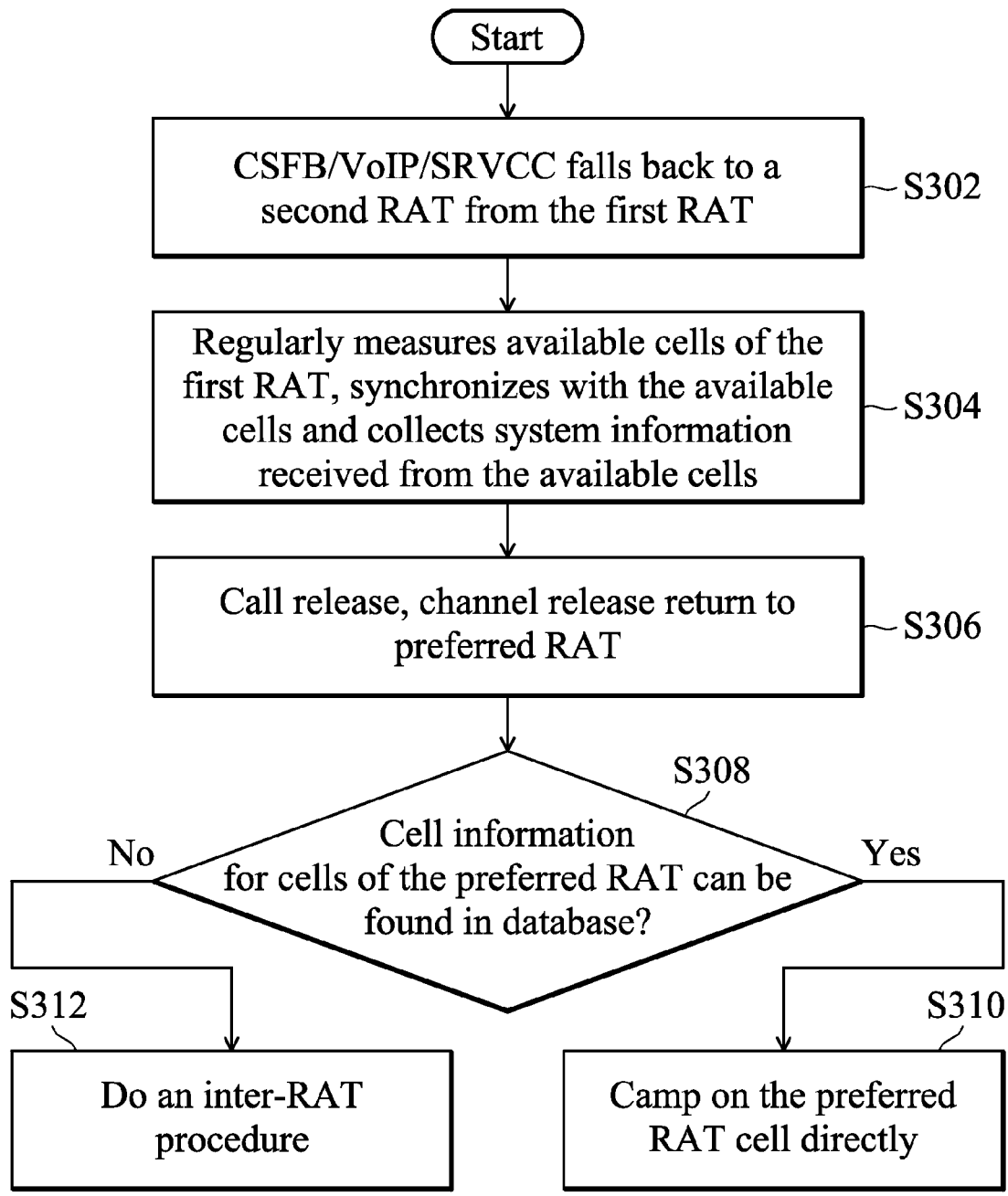
FIG. 3 is a flow chart illustrating a method for inter-RAT performance enhancement in a mobile communications device according to another embodiment of the invention.

FIG. 3 is a flow chart illustrating a method for an inter-RAT performance enhancement procedure in a mobile communications device according to another embodiment of the invention. In this embodiment, the mobile communications device is camped on a first cellular station of the first service network and is also capable of camping on a second cellular station of a second service network, wherein the first service network supports the long term evolution (LTE) technology or so-called 4G network and the second service network supports the GSM EDGE Radio Access or Universal Terrestrial Radio Access (UTRA) technology or so-called 2G/3G network. To begin, the mobile communications device receives a request message for CSFB/VoIP/SRVCC fall back to a second RAT from the first RAT (step S302). To be more specific, The mobile communications device moves or falls back to a second cellular station of the second RAT from the first cellular station of the first service network in one of several ways.

For Circuit Switch Fall Back (CSFB), the mobile communications device camps on a 4G cell, starts the procedure that needs CSFB to 2/3G network, and the mobile communications device performs the CFSB procedure to CSFB to 2G/3G network.

For VoIP, the mobile communications device camps on 4G cell, executes VoIP procedure, and the service network hands over the mobile communications device to 3G network.

For SRVCC, the mobile communications device camps on 4G cell, executes VoIP procedure, and the service network SRVCC handovers the mobile communications device to 2G/3G network.

After being camped on the 2G/3G network, the mobile communications device regularly measures available cells of the first RAT, synchronizes with the available cells, and collects system information received from the available cells (step S304).

In some embodiments, the mobile communications device may already have some preferred RAT cells information before Step 302 so that it can keep them for the following procedure. During the legacy RRC connection, the mobile communications device regularly measures possible preferred RAT cells, synchronizes them, and collects their system information.

In some embodiments, the mobile communications device may re-collect system information of each cell in a regular period. Further, the mobile communications device may also add preferred RAT cells in a measurement list and continue to monitor their quality.

Thereafter, Call is released and channel is also released, and thus return to preferred RAT (step S306). It is understood that when the CS service of CSFB, VoIP, SRVCC is released, the mobile communications device may either locally releases the RRC connection to release the call connection of the second RAT or receives channel release from network to release the channel connection of the second RAT from the network.

To return to the preferred RAT, the mobile communications device further determines whether any cell information of the preferred RAT can be found in database (Step S308). The mobile communications device may be redirected, Cell Change Order, or autonomous return to preferred RAT frequency or cell.

If the mobile communications device finds that there is cell information for at least one cell of the preferred RAT in the database (Yes in step S308), the mobile communications device can choose a cell which has already received system information and camp on the chosen preferred RAT cell directly (step S310). Thus, the camping time can be reduced.

If the mobile communications device cannot find any cell information for the preferred RAT in the database (No in step S308), the mobile communications device perform a normal inter-RAT procedure to return to the preferred RAT (step S312). If the mobile communications device cannot choose the cell which has collected system information, the mobile communications device performs the procedure according to the inter-RAT procedure. The mobile communications device may need to execute a PLMN search to measure available cells of the first RAT, synchronize with the available cells and collect system information received from the available cells and then perform a cell redirection or cell reselection procedure to select one cell of the preferred RAT to camp on.

In some embodiments, the mobile communications device can measure and collect cell information of the first RAT after the call connection of the second RAT is released while the channel connection of the second RAT still remains.

Figure 4:
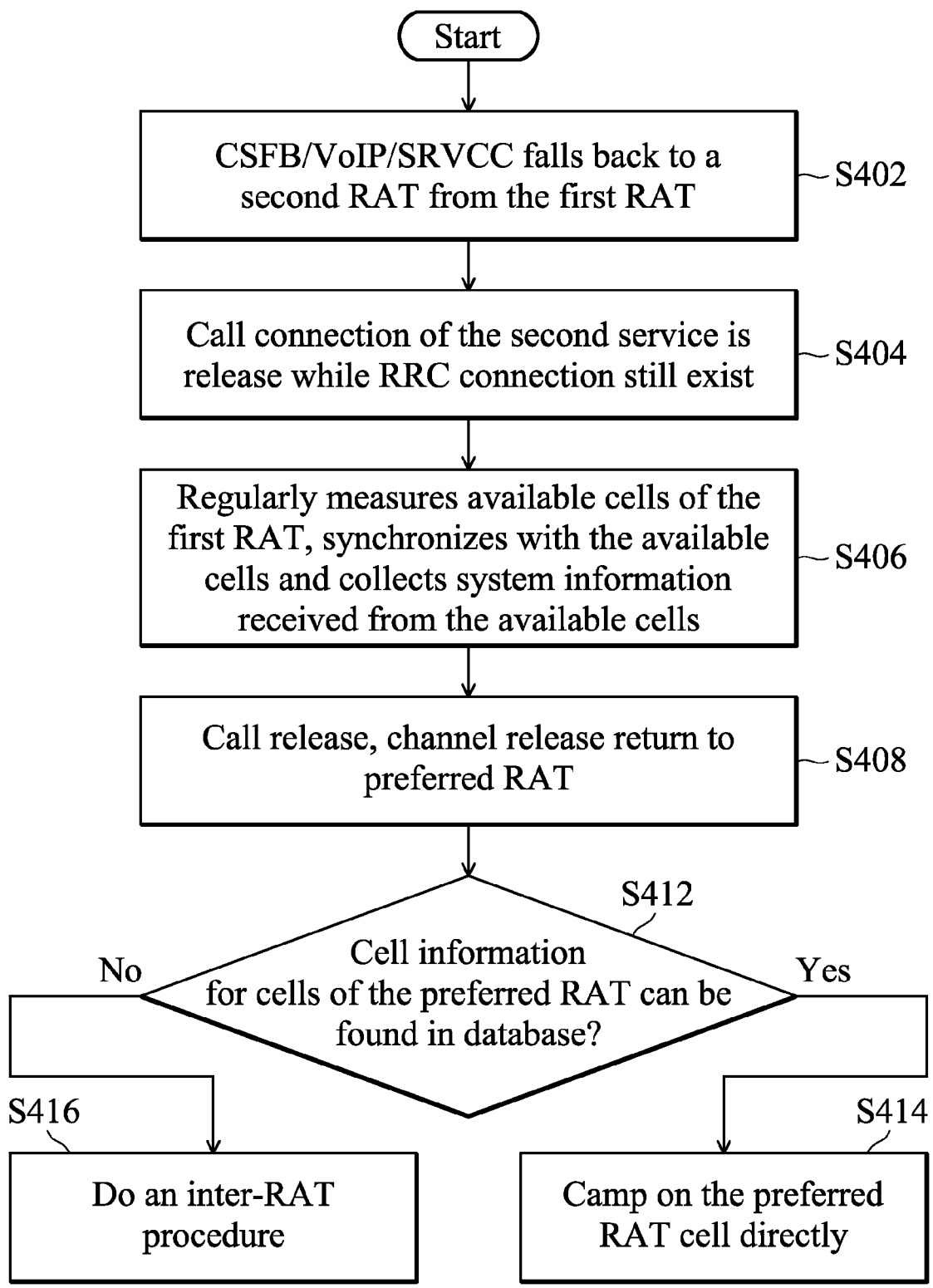
FIG. 4 is a flow chart illustrating a method for inter-RAT performance enhancement in a mobile communications device according to yet another embodiment of the invention.

FIG. 4 is a flow chart illustrating a method for inter-RAT change performance enhancement procedure in a mobile communications device according to another embodiment of the invention. In this embodiment, the mobile communications device is camped on a first cellular station or a first cell of the first service network and is also capable of camping on a second cellular station or a second cell of a second service network, wherein the first service network supports the long term evolution (LTE) technology, or the so-called 4G network, and the second service network supports the GSM EDGE Radio Access or Universal Terrestrial Radio Access (UTRA) technology, or the so-called 2G/3G network. To begin, the mobile communications device receives a request message to CSFB/VoIP/SRVCC fall back to a second RAT from the first RAT (step S402). To be more specific, The mobile communications device moves or falls back to a second cellular station of the second RAT from the first cellular station of the first service network in one of several ways. For Circuit Switch Fall Back (CSFB), the mobile communications device camps on 4G cell, starts the procedure that need CSFB to 2/3G network, and the mobile communications device performs the CFSB procedure to CSFB to 2/3G network. For VoIP, the mobile communications device camps on 4G cell, executes VoIP procedure, and the service network handovers the mobile communications device to 3G network. For SRVCC, the mobile communications device camps on 4G cell, executes VoIP procedure, and the service network SRVCC handovers the mobile communications device to 2G/3G network.

After being camping on the 2G/3G network, the mobile communications device performs a second service (e.g. a CS voice call) in the 2G/3G network. Upon completion of the CS voice call, the call connection of the second RAT is released while the channel connection of the second RAT is not released immediately (step S404). It is understood that, when the CS service of CSFB, VoIP, SRVCC is released, the mobile communications device may either locally release the RRC connection or receive channel release from the network. The mobile communications device may still keep the RRC connection and the network does not disconnect it immediately. The mobile communications device may perform the regular measurement and collection of the cells of the first RAT at this time.

Therefore, prior to disconnecting from the network, the mobile communications device regularly measures available cells of the first RAT, synchronizes with the available cells, and collects system information received from the available cells (step S406).

In some embodiments, the mobile communications device may already have some information on preferred RAT cells before Step 402 so that it can keep them for the following procedure. Prior to disconnecting from the network, the mobile communications device regularly measures possible preferred RAT cells, synchronizes them, and collects their system information.

In some embodiments, the mobile communications device may re-collect system information of each cell in a regular period. Furthermore, the mobile communications device may also add preferred RAT cells in a measurement list and continue to monitor their quality.

After that, the call connection of the second RAT is released and the channel connection of the second RAT is also released (step S408). To return to the preferred RAT (e.g. 4G network), the mobile communications device further determines whether any cell information for at least one cell of the preferred RAT can be found in database (step S412). The mobile communications device may be redirected, Cell Change Order, or autonomous return to preferred RAT frequency or cell.

If the mobile communications device finds that there is cell information for at least one cell of the preferred RAT in the database (Yes in step S412), the mobile communications device can choose a cell which has already received system information and camp on the chosen preferred RAT cell directly (step S414). Thus, the camping time can be reduced.

If the mobile communications device cannot find any cell information of the preferred RAT in database (No in step S412), the mobile communications device performs a normal inter-RAT procedure to return to the preferred RAT (step S416). If the mobile communications device cannot choose the cell which has collected system information, the mobile communications device performs the procedure according to the inter-RAT procedure. The mobile communications device may need to execute a PLMN search to measure the available cells of the first RAT, synchronize with the available cells and collect system information received from the available cells and then perform cell redirection or cell reselection procedure to select one cell of the preferred RAT to camp on.

According to the embodiments of the present invention, the mobile communications device can move back to a first RAT according to cell information, which is collected when the mobile communications device camps on a second RAT from the first RAT. Thus, the mobile communications device does not require cell information from the network after the service in the second RAT is completed, so that the number of signaling is reduced and the mobile communications device can quickly move to the camped RAT, thus reducing the camping time and the time for returning and enhancing the performance of inter-RAT procedure.

The method for inter-RAT performance enhancement may be implemented in program code stored in a machine-readable storage medium, such as a magnetic tape, semi-conductor, magnetic disk, optical disc (e.g., CD-ROM, DVD-ROM, etc.), or others, and when loaded and executed by a processing unit, a micro-control unit (MCU), or the controller module 114 in FIG. 1, the program code may perform the method of the measurement reporting. In addition, the method may be applied to any mobile communications device supporting the WCDMA technology and/or the LTE technology.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for inter-radio access technology (inter-RAT) performance enhancement in a mobile communications device, comprising:
camping on a first RAT to perform a first service;
moving/falling back to a second RAT from the first RAT to perform a second service;
measuring and collecting cell information of the first RAT during the performance of the second service in the second RAT; and
determining a first cell to return to the first RAT according to the collected cell information of the first RAT after a channel connection of the second RAT is released,
wherein measuring and collecting cell information of the first RAT further comprises periodically measuring available cells of the first RAT, synchronizing with the available cells and collecting system information received from the available cells, and the method further comprises recollecting the system information received from the available cells in a predetermined time period and adding the recollected cell information to a measurement list for further measurement.

2. The method of claim 1, wherein determining the first cell to return to the first RAT according to the collected cell information of the first RAT further comprises:
determining whether any cell information of the first RAT is found after the second service is completed and if so, determining the found cell to be the first cell to return to the first RAT.

3. The method of claim 2, further comprising performing an inter-RAT procedure to measure available cells of the first RAT, synchronize with the available cells and collect system information received from the available cells to return to the first RAT when determining that no cell information of the first RAT is found.

4. The method of claim 1, wherein the first RAT is long term evolution (LTE) related technology, and the second RAT is 2G/3G related technology.

5. The method of claim 1, wherein moving/falling back to the second RAT from the first RAT to perform the second service is performed when the mobile communications device performs handover, circuit-switched fallback (CSFB), voice-over-LTE (VoIP) or Single Radio Voice Call Continuity (SRVCC).

6. The method of claim 1, further comprising performing a cell reselection or redirection procedure, a cell change order (CCO) procedure or an autonomous return procedure to return to the first RAT.

7. The method of claim 1, wherein the measurement and collecting cell information of the first RAT is performed at the time that the call connection of the second RAT is released while the channel connection with a connected network of the second RAT is not released.

8. The method of claim 1, wherein measuring and collecting cell information of the first RAT while connected in the second RAT is performed by determining idle times which are gap or unused times between each two successive signal reception of the second RAT while connected in the second RAT and measuring and collecting cell information of the first RAT in the determined idle times.

9. A mobile communications device, comprising:
a wireless transceiver performing wireless transceiving to and from a first cellular station of a first service network in compliance with a first radio access technology (RAT) and a second cellular station of a second service network in compliance with a second RAT, wherein the first RAT is a long term evolution (LTE) related technology and the second RAT is 2G/3G related technology; and
a controller having circuits for camping on the first RAT to perform a first service, moving/falling back to the second RAT from the first RAT to perform a second service and measuring and collecting cell information of the first RAT during the performance of the second service in the second RAT via the wireless transceiver, and determining a first cell to return to the first RAT according to the collected cell information of the first RAT after a call connection of the second RAT is released,
wherein the controller further periodically measures available cells of the first RAT, synchronizes with the available cells and collects system information received from the available cells and the controller further recollects the system information received from the available cells in a predetermined time period and adds the recollected cell information to a measurement list for further measurement.

10. The mobile communications device of claim 9, wherein the controller further determines whether any cell information of the first RAT is found after the second service is completed and if so, determines the found cell to be the first cell to return to the first RAT.

11. The mobile communications device of claim 10, wherein the controller further performs an inter-RAT procedure to measuring available cells of the first RAT, synchronizes with the available cells and collects system information received from the available cells to return to the first RAT when determining that no cell information of the first RAT is found.

12. The mobile communications device of claim 9, wherein the controller further moves/falls back to the second RAT from the first RAT to perform the second service by performing handover, circuit-switched fallback (CSFB), voice-over-LTE (VoIP) or Single Radio Voice Call Continuity (SRVCC).

13. The mobile communications device of claim 9, wherein the controller further performs a cell reselection or redirection procedure, a cell change order (CCO) procedure or an autonomous return procedure to return to the first RAT.

14. The mobile communications device of claim 9, wherein the controller further performs the measurement at the time that the call connection of the second service is not released.

15. The mobile communications device of claim 9, wherein the controller further performs the measurement at the time that the call connection of the second service is released while the channel connection with the second network is not released.

16. The mobile communications device of claim 9, wherein the wireless transceiver further includes a first receiver and a second receiver and the controller further measures and collects cell information of the first RAT while connected in the second RAT by measuring and collecting cell information of the first RAT via the first receiver during the performance of the second service in the second RAT via the second receiver.

* * * * *